(12) United States Patent
Lai et al.

(10) Patent No.: US 7,894,193 B2
(45) Date of Patent: Feb. 22, 2011

(54) MECHANISM FOR SAVING SPACE IN DESKTOP COMPUTER

(75) Inventors: Chun-Chang Lai, Taipei Hsien (TW); Chien-Ching Chang, Taipei Hsien (TW)

(73) Assignee: Aopen Inc., Hsichih, New Taipei (TW)

( * ) Notice: Subject to any disclaimer, the term of this patent is extended or adjusted under 35 U.S.C. 154(b) by 255 days.

(21) Appl. No.: 11/487,490

(22) Filed: Jul. 17, 2006

(65) Prior Publication Data
US 2007/0195509 A1     Aug. 23, 2007

(30) Foreign Application Priority Data
Feb. 22, 2006 (TW) ................ 95105902 A

(51) Int. Cl.
H05K 5/00  (2006.01)
H05K 7/16  (2006.01)
A47B 81/00 (2006.01)

(52) U.S. Cl. ................ 361/724; 361/727; 361/752; 312/223.2

(58) Field of Classification Search ................ 361/683, 361/685, 679.01–679.45, 679.55–679.59, 361/724–727, 784, 785, 752; 312/223.1, 312/223.2
See application file for complete search history.

(56) References Cited

U.S. PATENT DOCUMENTS 4,498,123 A * 2/1985 Fuss et al. ................ 361/825
5,136,468 A * 8/1992 Wong et al. ................ 361/683
5,438,476 A * 8/1995 Steffes ................ 361/683
5,559,673 A * 9/1996 Gagnon et al. ................ 361/695
5,865,518 A * 2/1999 Jarrett et al. ................ 312/223.2
5,986,883 A * 11/1999 Johnson et al. ................ 361/695
6,247,767 B1 * 6/2001 Liu et al. ................ 312/223.2
6,288,901 B1 * 9/2001 Liu et al. ................ 361/724
6,700,778 B1 * 3/2004 Wang ................ 361/690
6,961,236 B1 * 11/2005 Chao ................ 361/683
7,205,474 B2 * 4/2007 Ya ................ 174/50
2004/0105222 A1 * 6/2004 Chen et al. ................ 361/683
2007/0183124 A1 * 8/2007 Wung et al. ................ 361/683

FOREIGN PATENT DOCUMENTS

CN     2422669 Y     3/2001

* cited by examiner

Primary Examiner—Jayprakash N Gandhi
Assistant Examiner—Nidhi Desai

(57) ABSTRACT

A mechanism for saving space in a desktop computer allows the number of groove holes of a back plate of a rack is less than the number of interface card slots of a motherboard to cause at least one of the interface card slots to be left unused so as to shorten the height of the back plate and further to shorten the height of the rack. Furthermore, a design allowing the rear end of a power support to be extended out of the back plate to the outside with a small distance by moving the back plate toward the front end of the rack further to shorten the length of the rack to allow a desktop computer to be lighter and handier.

5 Claims, 5 Drawing Sheets

US 7,894,193 B2

MECHANISM FOR SAVING SPACE IN DESKTOP COMPUTER

FIELD OF THE INVENTION

The present invention relates to a desktop computer, and more particularly to a mechanism design for saving space in a desktop computer.

DESCRIPTION OF RELATED ART

ATX possesses superiority on a cheap price; it has already applied broadly in desktop computers.

There are many patents concerning a computer combined with a motherboard with an ATX specification, for example, U.S. Pat. No. 6,961,236 disclosing "Computer Chassis", U.S. Pat. No. 6,137,678 disclosing "Configuring A Computer System", Taiwan Utility Patent No. M279,144 disclosing "Back Plate for Computer Chassis", Taiwan Utility Patent No. M271,193 disclosing "Back Plate Structure for Computer Mainframe Box", Taiwan Utility Patent No. M258,544 disclosing "Computer Mainframe Housing Adaptable to ATX and BTX Specifications".

Please refer to FIG. 1. A general computer mainframe combined with a motherboard 11 with an ATX specification is adapted to combine the motherboard 11 vertically at one side in a rack 10 of a computer mainframe. The motherboard 11 with an ATX specification is provided with seven interface card slots 111, 112, 113, 114, 115, 116 and 117 used for combining interface cards such as a LAN card, Modem card, USB interface card and sound card. A back plate 12 of the rack 10 is provided with seven groove holes corresponding to the interface card slots 111, 112, 113, 114, 115, 116 and 117 for receiving connecters of the interface cards. A front frame 13 combined with a hard disc deriver, optical disc driver, magnetic disc driver, card reader and etc is disposed at the front end of the rack 10. The back plate 12 is further combined with a power supply 14 and fan 15. The height of the whole rack is usually more than 40 centimeters.

DESCRIPTION OF PRESENT INVENTION

For allowing the height of a computer mainframe combined with a motherboard with an ATX specification to be decreased and volume thereof to be reduced, the present invention is proposed.

The main object of the present invention is to provide a mechanism for saving space in a desktop computer, enabling the height of a computer mainframe to be decreased so as to reduce the volume thereof and the product to be shortened so as to enhance the product competition ability.

Another object of the present invention is to provide a mechanism for saving space in a desktop computer, enabling the volume of a computer mainframe to be reduced, the material expenses to be saved so as to save the production cost.

A further object of the present invention is to provide a mechanism for saving space in a desktop computer, enabling the volume of a computer mainframe to be reduced, the packing material expenses to be saved, the occupied space thereof to be saved while transporting so as to save the transportation cost.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Because the manufacturing technology of a motherboard has been progressing more and more, and the functions thereof is strong more and more, for example, the functions of interfaces such as a LAN card, modem card, USB interface card and sound card are already built in the motherboard so as to cause a certain interface card slots in the motherboard to be left unused.

Figure 1:
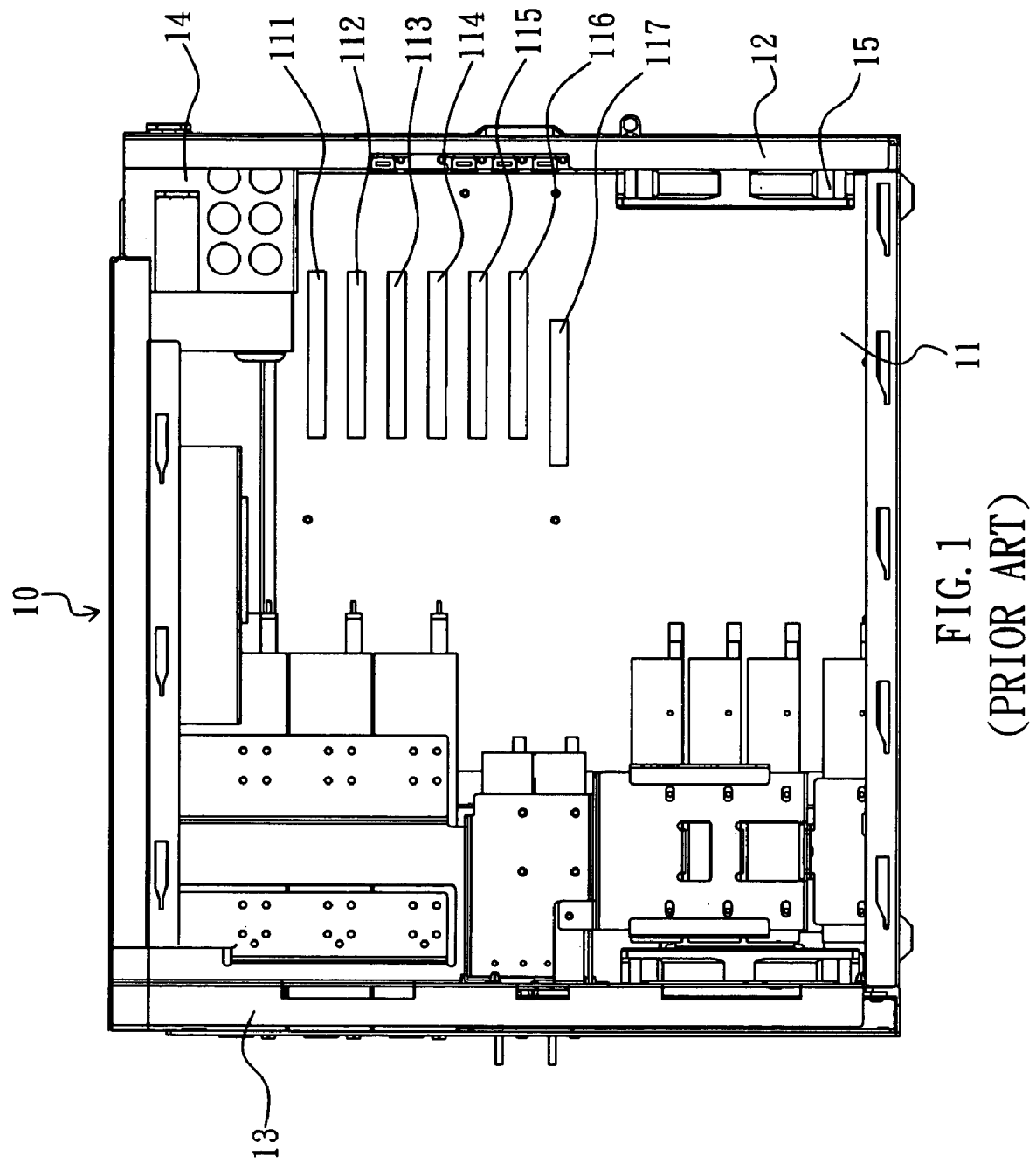
FIG. 1 is a schematic view of an electronic component disposition inside a conventional computer mainframe.
Figure 2:
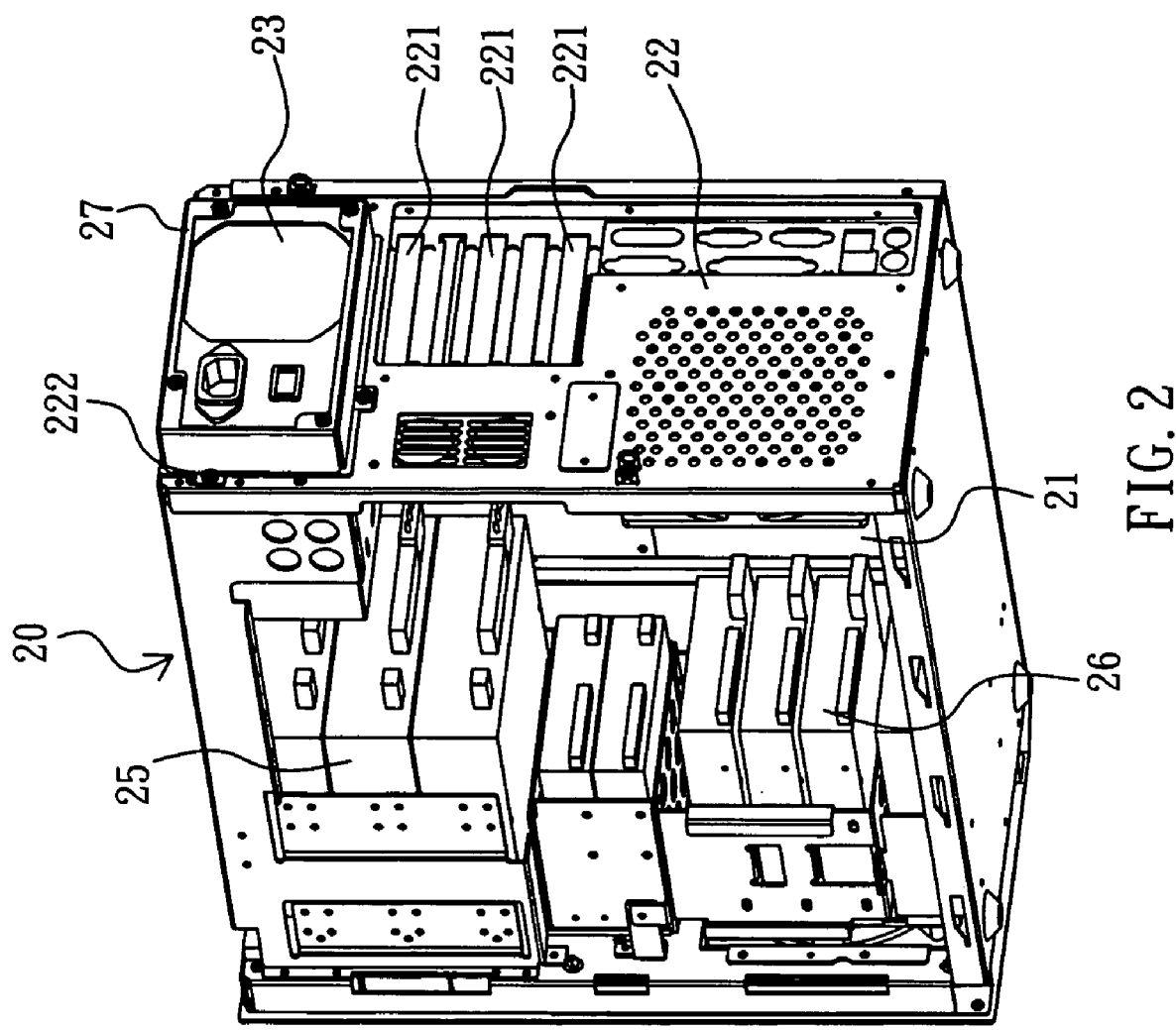
FIG. 2 is a perspective view, showing an electronic component disposition in a computer mainframe of a preferred embodiment of the present invention.
Figure 3:
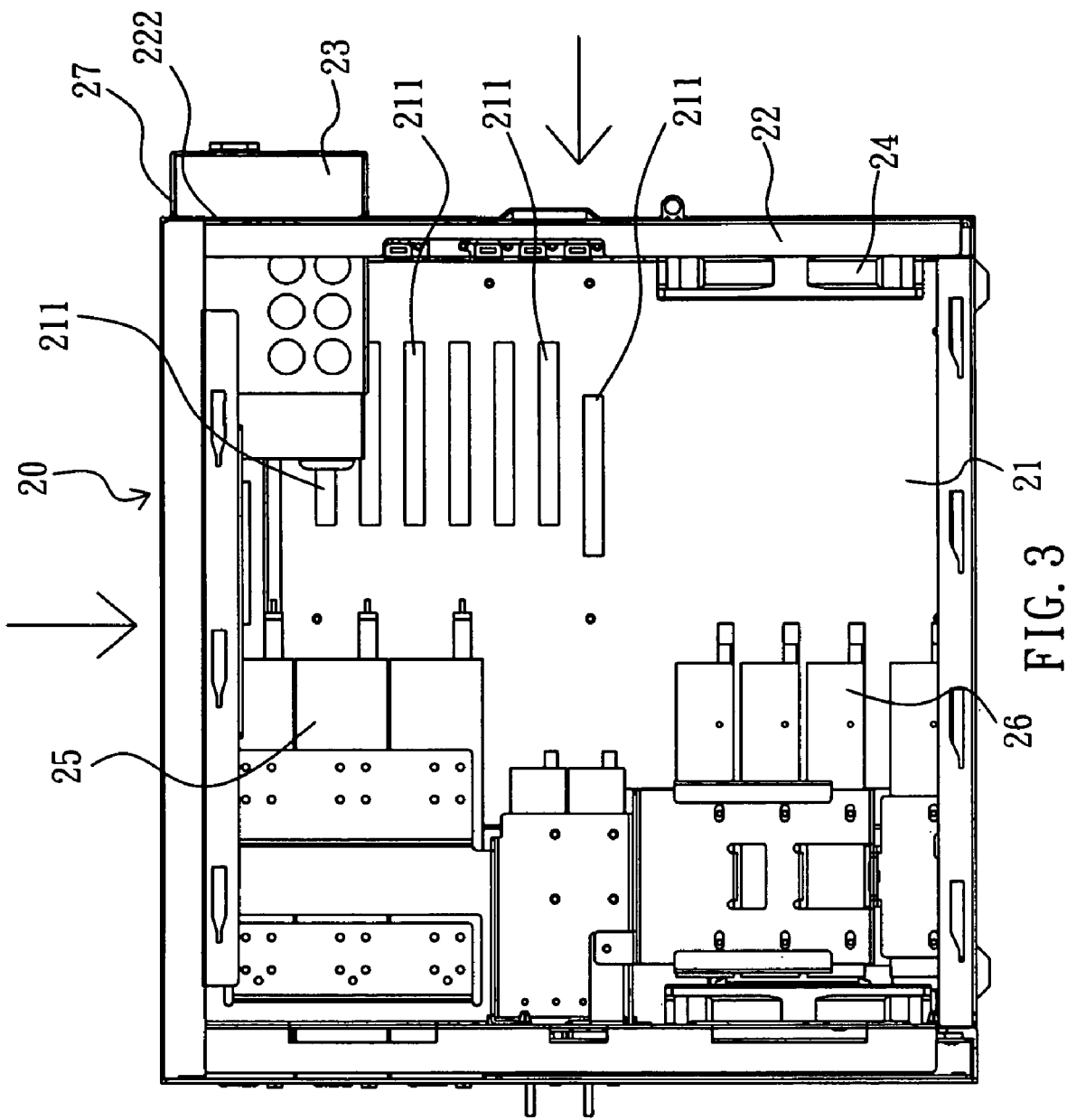
FIG. 3 is a schematic view, showing an electronic component disposition inside a reduced space of a computer mainframe of a preferred embodiment of the present invention.

Please refer to FIGS. 2 and 3. FIGS. 2 and 3 show a mechanism for saving space in a desktop computer of a preferred embodiment according to the present invention; the mechanism is used for enabling the computer mainframe to occupy a smaller space. The computer mainframe comprises a rack 20 inside which one side thereof is combined with a motherboard 21 with an ATX specification. The number of groove holes 221 of a back plate 22 of a rack 20 is at least one less than the number of interface slots 211 of the motherboard to cause at least one interface slot 211 to be left unused. The motherboard 21 is provided with at least seven interface slots 211 and the back plate 22 is only provided with groove holes 221 corresponding to the four slots at the middle and the lower of the seven interface slots 211 in the present embodiment; the number of the groove holes 221 is at least two less than the number of the interface slots to caused two interface slots 211 to be left unused. Furthermore, the upper end of the groove holes 221 of the back plate 22 is provided with a first groove hole 222 for receiving a power supply 23.

For reducing the height of the rack 20 of the computer mainframe, the present invention is used for processing the reduction of the internal space of the rack 20; it mainly allows the back plate 22 to be reduced with two groove holes 221 to cause the first groove hole 222 combined with the power supply 23 to be moved downward such that the power supply 23 occupies the positions used for installing two interface cards formerly. Therefore, the space corresponding to two interface card slots 211 left unused and close to the upper end of the motherboard 21 is allowed to be used such that the height of the rack 20 is caused to shorten 3 centimeters approximately.

In the present embodiment, the upper end of the back plate 22 is combined with the power supply 23 and the lower end thereof is combined with a fan 24. An enough interval must exist between the power supply 23 and a disc driver 25 in front thereof so as to be convenient for the arrangement of electrically connected wires and beneficial for the cooling of each electronic component. The fan 24 is rather flat, and there is a longer distance between it and other electronic components 26 in front thereof. Therefore, the back plate 22 can be further moved toward the front end of the rack 20 to enable the length of the rack 20 to be shortened with 3 centimeters approximately. But, for allowing the power supply 23 and the disc driver 25 in front thereof to be maintained with a similar distance so that the rear end of the power supply 23 is caused to extend out of the back plate 22, it can then attain to the length shortening of the rack 20, and further not influence the internal cooling space of the rack 20 and the line arrangement space between each electronic component as FIG. 3 shows.

Figure 4:
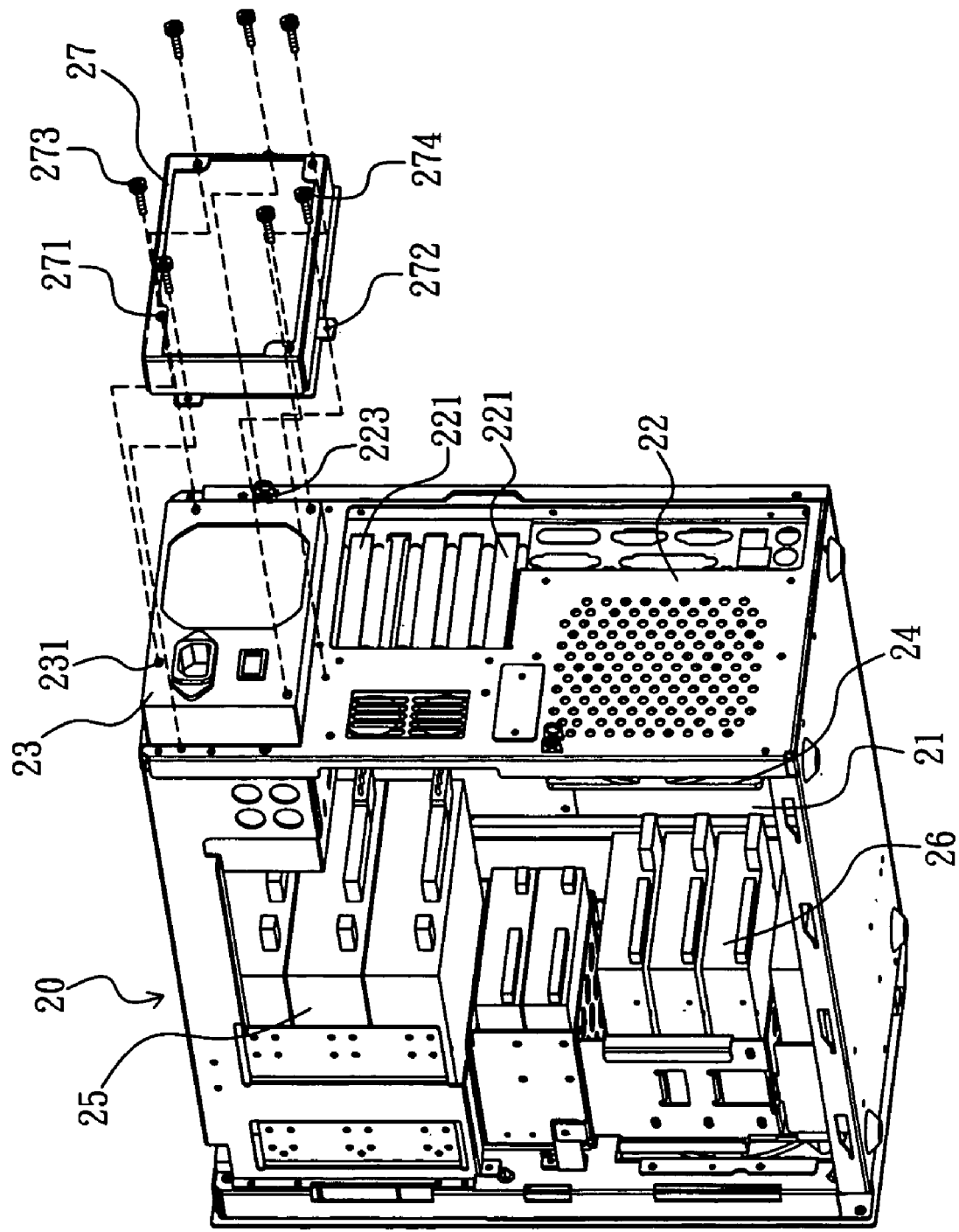
FIG. 4 is a perspective view, showing a computer mainframe of a preferred embodiment when a rear supporting frame is not assembled therein.
Figure 5:
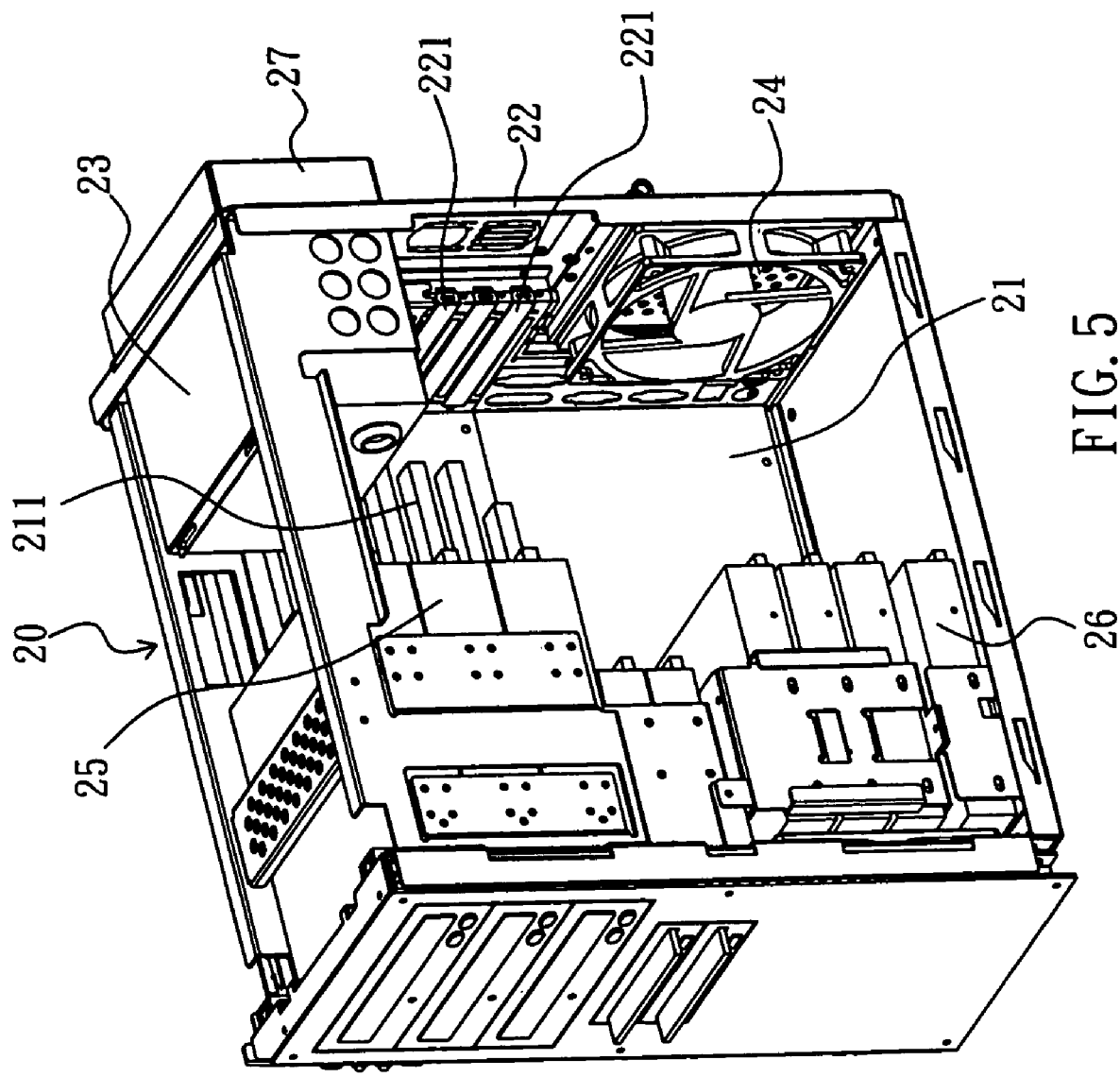
FIG. 5 is a perspective view, showing an electronic component disposition of another preferred embodiment according to the present invention.

Please refer to FIGS. 2, 4 and 5. The mechanism of the present invention further comprises a rear supporting frame 27 engaged at the rear end of the power supply 23. The rear supporting frame 27 is disposed with a plurality of holes 271 and 272. A plurality of bolts 273 and 274 are passed through the holes 271 and 272 to screw in the screw holes 231 and 223 corresponding to the power supply 23 and the back plate 22 to enable the rear end of the power supply 23 and the rear supporting frame 27 to be combined stably and rear supporting frame 27 and the back plate 22 to be combined stably.

Please refer to FIGS. 3 and 5. The present invention allows the number of the groove holes 221 of the back plate 22 of the rack 20 to be less than the one of the interface card slots 211 of the motherboard 21 to enable the power supply 23 or other electronic components to occupy the space corresponding to the left-unused interface card slots 211 so as to shorten the height of the rack 20. Furthermore, the design allowing the rear end of the power supply 23 to be extended out of the back plate 22 with a small distance by moving the back plate 22 toward the front end of the rack 20 can further shorten the length of the rack 20 to cause the whole rack 20 to be lower and shorter so that the outlook of the desktop computer becomes lighter, handier and compacter. Furthermore, the manufacturing material and the production cost can be saved owing to the reduction of the product volume, the package material can be saved owing to the reduction of the product volume and the transportation cost can be saved owing to the smaller space occupied by the product while transporting.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mechanism for saving space in a desktop computer, used for allowing a computer mainframe to occupy a small space, sand computer mainframe comprising:
    a) a rack having a back plate having:
        i) a predetermined number of groove holes; and
        ii) a plurality of back plate holes;
    b) a motherboard located in an interior of the rack and having a predetermined number of interface card slots, each of the predetermined number of groove holes of the back plate corresponding to one of the predetermined number of interface card slots of the motherboard and being used for installing an interface card; the predetermined number of groove holes of the back plate being at least two less than the predetermined number of interface card slots of the motherboard allowing at least two alternative interface slots of the predetermined number of interface card slots of the motherboard to be unused;
    c) a power supply electrically connected to the motherboard and having a plurality of power supply holes, and an outer end of the power supply extending outwardly from the back plate; and
    d) a rear supporting frame located on an exterior of the back plate and surrounding the outer end of the power supply, the rear supporting frame having a plurality of first holes located on a front surface thereof and a plurality of second holes being located on a rear surface thereof, the rear supporting frame being connected to both the outer end of the power supply and the exterior of the back plate;
    wherein a corresponding one of the plurality of first holes of the rear supporting frame is connected to a corresponding one of the plurality of power supply holes of the power supply, and a corresponding one of the plurality of second holes of the rear supporting frame is connected to a corresponding one of the plurality of back plate holes of the back plate,
    wherein the back plate has a first groove hole, the power supply is inserted into the first groove hole; the power supply occupies a space in the rack to correspond to at least one of the unused alternative interface slots.

2. The mechanism for saving space in a desktop computer according to claim 1, wherein the motherboard is a motherboard having an ATX specification.

3. The mechanism for saving space in a desktop computer according to claim 1, wherein the first groove hole of the back plate is located adjacent to the predetermined number of groove holes.

4. The mechanism for saving space in a desktop computer according to claim 1, wherein the power supply occupies a space in the rack to correspond the two unused alternative interface slots.

5. The mechanism for saving space in a desktop computer according to claim 1, wherein further comprising a plurality of first bolts and a plurality of second bolts, one of the plurality of first bolts is inserted through the corresponding one of the plurality of first holes of the rear supporting frame and connected to the corresponding one of the plurality of power supply holes of the power supply, one of the plurality of second bolts is inserted through the corresponding one of the plurality of second holes of the rear supporting frame and connected to the corresponding one of the plurality of back plate holes of the back plate.

* * * * *